(12) United States Patent
Jiang et al.

(10) Patent No.: US 9,482,872 B2
(45) Date of Patent: Nov. 1, 2016

(54) AUTO STEREO DISPLAY SYSTEM FOR SUBWAY TUNNEL

(75) Inventors: Taiping Jiang, Torch (CN); Yangzhou Du, Torch (CN)

(73) Assignee: CELVISION TECHNOLOGIES LIMITED, Torch (CN)

( * ) Notice: Subject to any disclaimer, the term of this patent is extended or adjusted under 35 U.S.C. 154(b) by 81 days.

(21) Appl. No.: 14/116,429

(22) PCT Filed: Jun. 24, 2011

(86) PCT No.: PCT/CN2011/001052
§ 371 (c)(1),
(2), (4) Date: Jan. 17, 2014

(87) PCT Pub. No.: WO2012/151722
PCT Pub. Date: Nov. 15, 2012

(65) Prior Publication Data
US 2014/0177047 A1    Jun. 26, 2014

(30) Foreign Application Priority Data

May 9, 2011   (CN) .......................... 2011 1 0118688

(51) Int. Cl.
*G02B 27/22*     (2006.01)
*G09F 9/33*      (2006.01)
(Continued)

(52) U.S. Cl.
CPC ............. *G02B 27/2214* (2013.01); *G09F 9/33* (2013.01); *G09F 19/22* (2013.01); *H04N 13/0409* (2013.01); *H04N 13/0497* (2013.01)

(58) Field of Classification Search
CPC ...... G02B 27/2214; G09F 19/12; G09F 9/33

USPC ......................................................... 359/464
See application file for complete search history.

(56) References Cited

U.S. PATENT DOCUMENTS 5,264,964 A    11/1993  Faris
5,392,140 A *   2/1995  Ezra et al. ....................... 349/15
(Continued)

FOREIGN PATENT DOCUMENTS

CN    101321300    12/2008
CN    101562756    10/2009
(Continued)

OTHER PUBLICATIONS

Shiffmann https://processing.org/tutorials/pixels/ 2008.*
(Continued)

*Primary Examiner* — Zachary Wilkes
*Assistant Examiner* — George G King
(74) *Attorney, Agent, or Firm* — Rankin, Hill & Clark LLP

(57) ABSTRACT

An auto stereo display system for subway tunnel is disclosed. When a train is traveling through the tunnel at high speed, passengers can see stereo images outside the window by the system. The system is composed of LED light columns that vertically aligned at equal distance on the tunnel wall. Each LED light column is composed of multiple columns of LEDs and slit gratings. When the LEDs are changing with the changing instant speed of multi viewing angle image pixel array and the train, the passengers can see stereo image without glasses. The display system is specially applicable for business advertisement and nonprofit propagation in subway tunnel.

4 Claims, 4 Drawing Sheets

(51) Int. Cl.
*G09F 19/22* (2006.01)
*H04N 13/04* (2006.01)

(56) References Cited

U.S. PATENT DOCUMENTS

| | | |
|---|---|---|
| 6,859,240 B1* | 2/2005 | Brown et al. .................. 349/15 |
| 2004/0165217 A1* | 8/2004 | Vial et al. .................... 358/1.18 |
| 2010/0283839 A1 | 11/2010 | Liu et al. |
| 2011/0035777 A1* | 2/2011 | Chae et al. ..................... 725/75 |
| 2011/0187832 A1* | 8/2011 | Yoshida ......................... 348/46 |

FOREIGN PATENT DOCUMENTS

| | | | | |
|---|---|---|---|---|
| WO | WO2009128611 | * | 10/2009 | ............ 725/75 |
| WO | WO2010007787 | * | 1/2010 | ............ 348/46 |

OTHER PUBLICATIONS

Eddins http://www.mathworks.com/company/newsletters/articles/how-matlab-represents-pixel-colors.html 2006.*
International Search Report (ISR); PCT/CN2011/001052; 6 Pages; Feb. 16, 2012.

* cited by examiner

AUTO STEREO DISPLAY SYSTEM FOR SUBWAY TUNNEL

TECHNICAL FIELD

The present invention relates to a stereoscopic display field, and in particular to an auto stereoscopic display system for subway tunnels.

BACKGROUND OF THE TECHNOLOGY

In recent years, subway tunnel advertisement systems occur in some metropolis, which is a special display device mounted on tunnel walls. Passengers can observe static images or continually changing images outside the train window when the train runs in a tunnel at a high speed. However, this type of systems can only display 2D planar images.

SUMMARY OF THE INVENTION

The technical problem to be resolved by the present invention is to provide an auto stereoscopic display system for subway tunnels, which allow a passenger in the subway to image stereoscopic images on tunnel walls without glasses.

The technology solution to resolve the above said technical problem of the present invention is an auto stereoscopic display system for subway tunnels. The auto stereoscopic display system for subway tunnels consists of LED light bars which are equidistantly arranged vertically on tunnel walls; passengers can image stereoscopic images without glasses when the LEDs are arranged according to multi-angle image pixel arrays and the train's real-time speeds changes.

The beneficial effects of the present invention is that: in the present invention, passengers can image stereoscopic images without any special glasses while the train's real-time speeds are changing, because the LED light bars are equidistantly arranged vertically on tunnel walls, and the LEDs are also arranged according to multi-angle image pixel arrays.

Based on the technical solutions above, the present invention can also be improvement as the following:

Further, each LED light bar consists of multi-column LEDs and slit gratings; wherein, RGB colors of the LEDs are arranged horizontally, are arranged top-bottom vertically, and the LEDs have two arrangement modes in the vertical direction, that is, the LEDs are equidistant alignment or stagger in the vertical direction.

Further, in each of the light bars, the multi-column LEDs are used, accompanying the slit gratings arranged in front of the multi-column LEDs. The slit gratings are single-slit or multi-slit slit gratings.

Further, in order to eliminate black stripes in the scanned images, the multi-column of LEDs can be changed from the mode in which two adjacent rows are arranged in equidistant alignment in the vertical direction to the mode in which two adjacent rows are arranged in equidistant stagger in the vertical direction. That is, one regular arrangement of the LEDs is decomposed into two complementary embedded arrangements.

DETAILED DESCRIPTION OF PREFERRED EMBODIMENTS

With reference to the accompanying drawings, the principles and features of the present invention are described. The given embodiments are only applied to illustrate the present invention, but not to limit the scope of the present invention.

The present invention here describes a designing solution for auto stereoscopic display in the environment of subway tunnels, which causes a passenger to observe 3D stereoscopic images without wearing special glasses during traveling at a high speed.

Figure 1:
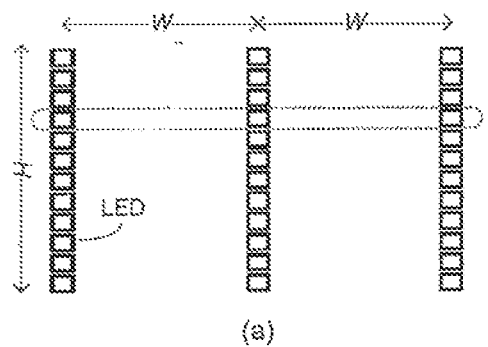
FIG. 1 is a diagram illustrating a 2D display system using LED light bars.
Figure 1:
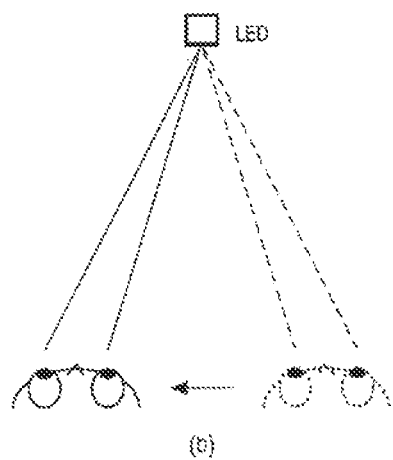
Figure 1:
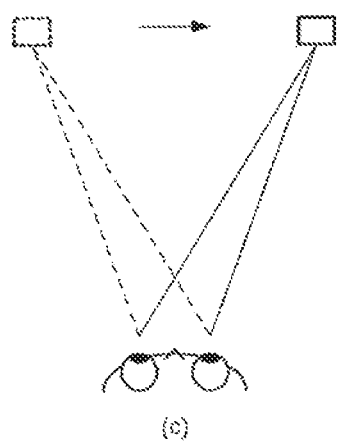

All display systems involved by the present invention use LED light bars. LED light bars are applied instead of LCD screens because LEDs have a low cost and a high luminance, and LEDs further have a very important feature for the tunnel display systems, that is, a sufficiently high operating frequency FIG. 1 ($a$) is a 2D display system wherein LED light bars are equidistantly arranged on tunnel walls when the LED light bars are applied. Wherein, a LED light bar is consisted of one column of LEDs, and one group of LED light bars is equidistantly arranged vertically on tunnel walls to form a display system. As shown in a dot and dash line in the FIG. 1 ($a$), the LEDs of different light bars must be aligned horizontally. FIG. 1 ($b$) is a 2D display system wherein an observer passes one LED light bar when a LED light bar is applied. FIG. 1 ($c$) is a scan line formed in the observer's eyes by the LEDs. FIGS. 1 ($b$) and ($c$) illustrate top images when a passenger observes LED light bars. Wherein, Each LED in the LED light bars forms a scan line in the imaging field of a passenger while a train passes the LED light bars. Let it be supposed that there is only one light bar in the imaging field of the passenger, one LED light bar can perform the scanning process of one frame of image. When the LEDs flash and illuminate according to a certain pixel array and the frame scan rate is high enough, the passenger can observe a clear and stable static image or animation sequence.

The displayed image can be expressed as a pixel array of PIC(i, j), where i=1 ..., M; j=1 ..., N. When a train travels at speed v, the illuminated color of the i-th LED on the light bar at time t should be:

$$\text{LED}_i(t) = \text{PIC}(i,j), \quad (1)$$

wherein $j = (\text{int}(v*t/\mu) \bmod N) + 1$.

Here, $\mu$ is the diameter of the LED, int( ) is a rounding arithmetic operation, mod is a modulo arithmetic operation. It is noted that it is unnecessary to radiate different color component by multiple LEDs, because one single LED can radiate lights with three primary color components: red, green and blue light by now.

Set the distance between adjacent LED light bars as a width of a scanned image, that is, $N*\mu$. By now, the frame scan rate r is calculated by the following equation:

$$r = v/(N*\mu) \quad (2)$$

Here is a design example with a display resolution of 640*480 pixels. Assuming $\mu=2$ mm, M=480, N=640, a height of a LED light bar is $H=M*\mu=0.960$ m, a distance between adjacent LED light bars is $W=N*\mu=1.280$ m. When the speed of the train is 70 km per hour, the operating frequency of the LEDs is $v/\mu=9722$ Hz. The frame rate of the images can be calculated by the equation (2), i.e. r is 15.2 frames per second. In order to further improve the frame rate, for example, to double the frame rate, the distance between adjacent LED light bars can be reduced by half so as to allow two LED light bars scan one frame of image simultaneously.

Figure 2:
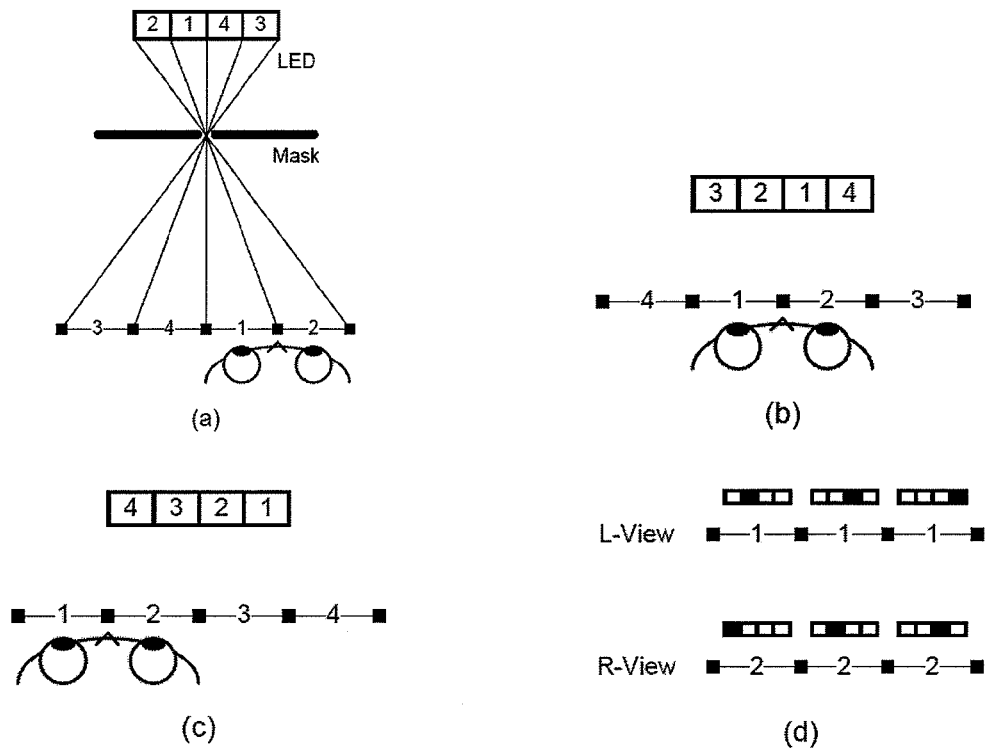
FIG. 2 is a diagram illustrating generating an auto stereoscopic display effect by using LED light bars.

Multi-angle images or their abbreviation MAI must be applied in order to form auto stereoscopic display effects. The LED light bars should be applied a mechanism, which allows the left and right eyes observe different scanned images respectively. FIG. 2 illustrates generating auto stereoscopic display images by using LED light bars. In FIG. 2 (a)-(c), the LEDs changes images according to the position of the head so as to allow that the left-eye always observe the first image, and so as to allow that right eye always observe the image No. 2 too. In FIG. 2 (d), the images observed by the eyes are illuminated by different LEDs sequentially, and each LED scans different regions of the same image. FIG. 2 is an example of using 4 images, wherein the LED light bar is formed by 4 columns of LEDs, and each column of LEDs display pixels from different images. Slit gratings in front of the LED light bars allow that each eye can only observe one column of LEDs through the slits, and two eyes can observe adjacent columns of LEDs through the slits. Regarding to the design methods of the slit grating and the arrangement methods of the slit gratings, please refer to the scientific and technical literature on the auto stereoscopic display. In some circumstances, slit gratings are called parallax barriers. Similar effects can also be achieved by micro-lenticular gratings. The present invention would be schematically illustrated all by slit gratings.

In FIG. 2 (a)-(c), the numerals in the LED blocks represent the numbers of the source images of the current pixels displayed by the LEDs. The numerals in front of the observer represent one region that is illuminated by the LEDs through the slits. Here, we assume that the observer is always moved in parallel with the tunnel walls, and all observation distances are kept constant. The arrangement of the slit gratings can allow that the one region illuminated by the LEDs is exactly equal to the distance between observer's eyes. Because the slit gratings exist, the illuminated visible regions are always taken in reverse order in comparison with the LED source images. Consider the particular circumstances in FIG. 2. When a passenger on the train goes through the light bars, the LEDs change the source images of the displayed pixels so as to allow the left-eye to observe the image NO. 1, and to allow the right eye to observe the image NO. 2. Therefore, as shown in FIG. 2 (d), the scanned images observed by the left eye are illuminated sequentially by the LEDs NO. 2, 3, and 4. In the same way, the scanned images observed by the right eye are illuminated sequentially by the LEDs NO. 1, 2, and 3. Thus, the observer observes a pair of images formed by the images NO. 1 and 2.

The multiple images displayed by the LEDs are a set of observations from left to right for a certain scene. In the case of the image NO. 4 of the FIG. 2, passengers can observe a stereoscopic effect by the pair of images formed by the images NO. 1 and 2, or by the images NO. 2 and 3, or by the images NO. 3 and 4. But the observer can not observe a stereoscopic effect by the pair of images formed by the images NO. 4 and 1, because this pair is not a proper stereoscopic matching pair. In general, passengers may have a probability of 1/K to get an incorrect stereoscopic matching pair when K images are applied.

Figure 3:
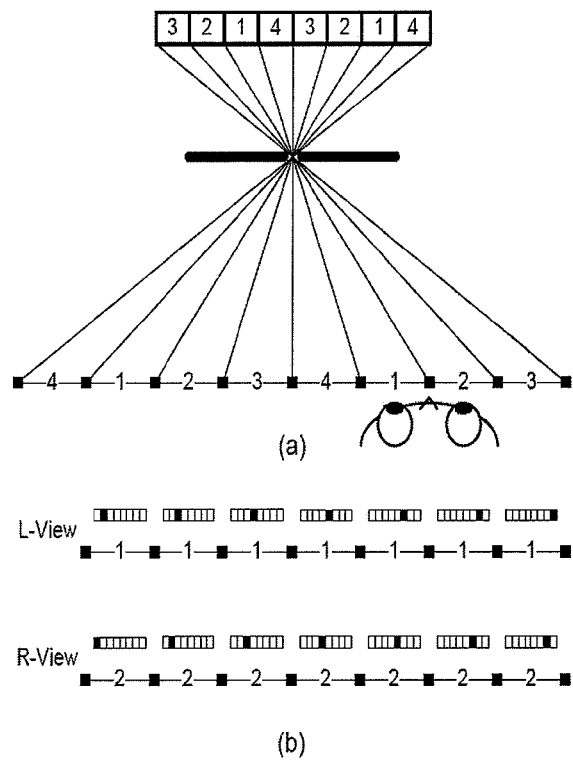
FIG. 3 is a diagram illustrating extending a visible region of stereoscopic imaging by using multi-column LEDs.
Figure 4:
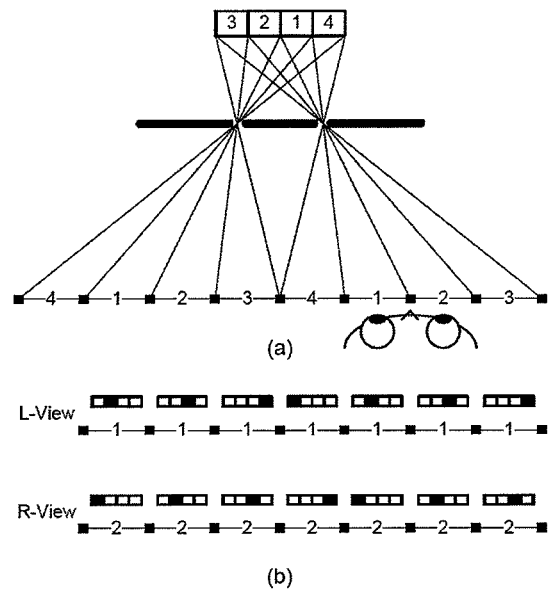
FIG. 4 is a diagram illustrating extending a visible range of stereoscopic imaging by using multiple slits.

Now let's consider one region illuminated by the LED light bars. The measurement of the one illuminated region is just equal to the distance between two eyes. And the distance is represented by a symbol of D. For an average person, D is selected as 65 mm. In FIG. 2, the one region illuminated by the LED light bars is limited to 4*D because of the slit gratings. And the common region illuminated of the two eyes are 3*D if a pair of images is formed. In other words, the visible region of the stereoscopic imaging is limited to 3*D, approximately 195 mm. If the visible range is intended to be extended, one solution is to apply more columns of LEDs on the light bars and keep the same amount of images. FIG. 3 illustrates extending a visible region of stereoscopic imaging by using multi-column LEDs. Here, 8 columns of LEDs are applied, and the visible region is increased to 7*D. In FIG. 2, 4 columns of LEDs are applied, and the visible region is 3*D. As shown in FIG. 3, (D is the distance between two eyes.). Another solution as shown in FIG. 4 is to keep the number of the columns of the LEDs equal to the amount of images, but multiple slits are carved on the slit gratings. FIG. 4 illustrates extending a visible range of stereoscopic imaging by using multiple slits. Here 2 slits are applied, and the visible region is increased to 7*D. And in FIG. 2, one slit is applied, the visible region is 3*D (D is the distance between two eyes.) In FIG. 2, the visible region of stereoscopic imaging is extended to 7*D.

In the case of auto stereoscopic imaging, the LEDs should select pixel values from different images. Assuming that there are K images, which are represented as $PIC_k$, wherein $k=1 \ldots, K$, and the resolution of each image is M*N. M rows and L columns of LEDs arranged on the light bar, the index is $LED_{i,j}$, wherein $i=1 \ldots, M$, $l=1 \ldots, L$. When the train travels at a speed v, the color of the LEDs illuminated at time t should be $$LED_{i,j}(t) = PIC_k(i,j) \quad (3)$$

Wherein, $k = (int(v*t/D-1) \bmod K)+1$, $j = (int(v*t/\mu) \bmod N)+1$.

Similarly as Equation (1), p is the diameter of the LEDs, int( ) is a rounding arithmetic operation, mod is a modulo arithmetic operation. In one second, it can be observed that the LEDs change their colors $v/\mu$ times and change the source images v/D times. And the image frame rate observed by the observer can be calculated by equation (2).

Figure 5:
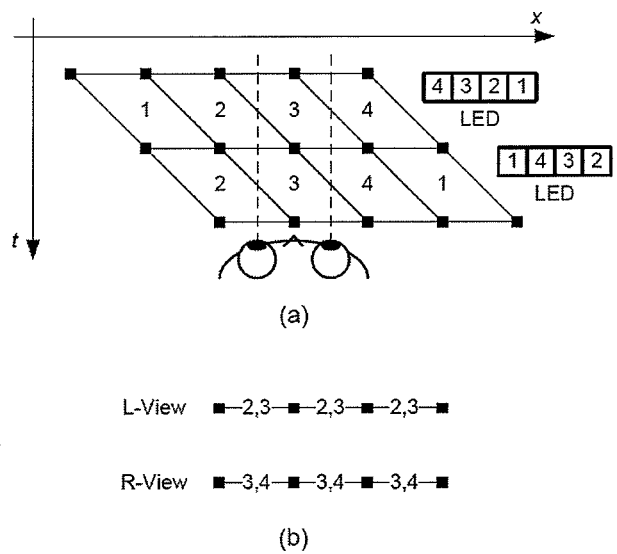
FIG. 5 is a schematic diagram illustrating that each eye observes non-homologous images.

In fact, in FIG. 2-4, there is a strong assumption, that is, the LEDs always change source images accurately when the eyes of the observer observe adjacent columns of the LEDs. If it is not the above said circumstance, the scanned images observed by each eye are not formed by a single image. FIG. 5 is a schematic diagram illustrating that each eye observes non-homologous images, which occurs in the circumstance that the two eyes of the observer are not on the boundary of the illuminated regions by the LEDs when the LEDs changes images. By using a coordinate system consisting of a position x and a time t, FIG. 5 (a) illustrates that the regions illuminated by the LEDs move over time and that the source images of the LEDs change. Because the two eyes of the observer are not on the boundary of the illuminated regions when the LEDs change the source images, the images observed by the observer are not formed by a single image. In the direction of dotted lines representing the time proceeds, the left eye observes the pixels of the image No. 3 first, and then observes pixels of the image No. 2. After the LEDs have changed the source images, the left eye observes the pixel of the image No. 3 again, and then observes the pixels of the image No. 2. This process is repeated until the eyes are not illuminated by any LED. Thus, as shown in FIG. 5 (*b*), the scanned images observed by the left eye is a mixture of the images No. 2 and No. 3. And the scanned images observed by the right eye is a mixture of the images No. 3 and No. 4. The composition ratio of the two images is determined by the head position of the observer. It can be seen that each eye will observe homologous images if the observer move to the left or to the right half of the distance between the two eyes of the observer.

Figure 6:
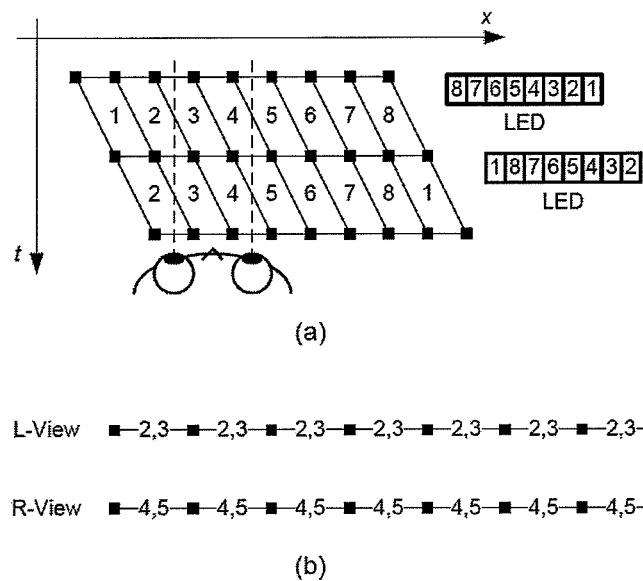
FIG. 6 is a diagram illustrating reducing the stitching phenomenon for non-homologous images by allowing two eyes observe across multiple images.

Non-homologous images will affect the observation quality, and generate the stitching effect at the position where the images change. Because the position of the head of the observer is arbitrary, non-homologous images in the whole design can not be avoided. In order to reduce the stitching phenomenon in non-homologous images, the amount of images is doubled, and the distance between adjacent gratings is doubled too, so that the two eyes observe across two images. It can allow two eyes observe across n+1 images if the amount of the images is increased to n. FIG. 6 is a diagram of reducing the stitching phenomenon for non-homologous images by allowing two eyes observe across multiple images. Here is an example of 8 images, wherein the illuminated regions of each LED are reduced by half. FIG. 6 (*a*) illustrates an example of 8 images, wherein the illuminated regions of each LED are reduced by half, that is, the amount of images is doubled, and the distance between adjacent gratings is doubled too. Thus, the two eyes can observe across two images. For example, the left eye observes the image No. 2, the right eye observes the image No. 4. Alternatively, the left eye observes the image No. 3 and the right eye observes the image No. 5. In comparison with the circumstance in FIG. 5 (*b*), as shown in FIG. 6 (*b*), the quality of stereoscopic imaging is better although each eye still observes non-homologous images. The reason for the above said comparison result is that the parallax of adjacent images is reduced when the two eyes observe across more images and the depth perception is kept unchanged. In other words, when multiple images are observed across, the parallax of non-homologous images observed by one single eye is less than the parallax of non-homologous images observed by two eyes. It should be noted that: when two eyes observe across multiple images, the benefit is a reduction of the stitching effect, however the cost is an increase of the probability for the observer to observe mismatching images. As shown in FIG. 5, the probability for the observer to observe mismatching images is not 1/8, but 1/4.

Figure 7:
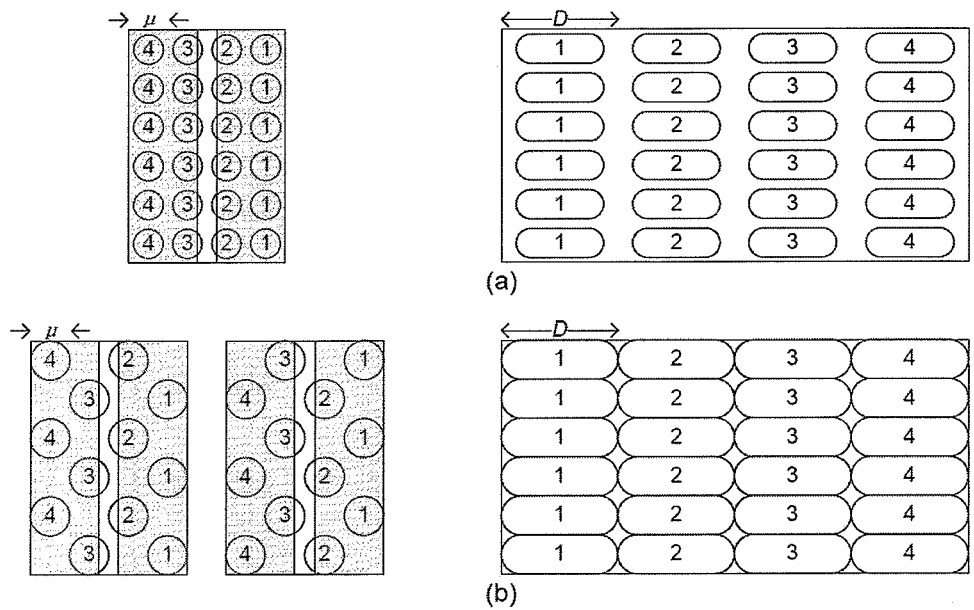
FIG. 7 is a diagram illustrating decomposing one LED light bar into two LED light bars.

In practical projects, LED tubes are circular, and the gap between two LEDs is also required to be considered. Therefore, un-illuminated regions would exist in the scanned images. FIG. 7 is a diagram illustrating decomposing one LED light bar into two LED light bars. In FIG. 7 (*a*), the gap between adjacent LEDs will generate the un-illuminated regions in the scanned images. In FIG. 7 (*b*), one regular arrangement of LEDs will be decomposed into two complementary embedded arrangements. The diameter of the LEDs can be slightly larger in order to eliminate the un-illuminated regions. In FIG. 7 (*a*), the left part indicates a regular arrangement of the LEDs' arrays behind the slit gratings. And the right part indicates the illuminated regions of corresponding LEDs in the scanned images. Similarly, the illuminated regions are taken in reverse order in comparison with the LEDs. It can be seen the un-illuminated regions show the vertical and horizontal black stripes in the eyes of the observer. The height of the horizontal stripes is equal to the vertical gap of the LEDs, and the width of the vertical stripes is equal to the product of the LEDs' horizontal gap and an amplification factor D/μ. Herein, the symbol definitions refer to equation (3). Even if the LEDs are square and are closely arranged, the LED's boundary will cause the intermittent of the scanned images, and generating black stripes in the eyes of the observer. As shown in FIG. 7 (*b*), an effective solution is to decompose a regular arrangement of the LED light bars into two embedded arrangements, and put them onto two LEDs respectively. By now, a half of the scanned image regions of each LED light bar (similar to a chessboard grid pattern), and two complementary embedded scans generate a complete scanned images observed by the observer. Thus, LED's diameter can be slightly larger so as to eliminate the vertically and horizontally black stripes.

Hereto, the above given display design of planar images can be extended to the auto stereoscopic display field. When 16 images are applied, 16 columns of LEDs can be placed on each light bar, and illuminated regions of the LEDs can be increased according to the method as shown in FIG. 4. When the two eyes observe across two images, the probability for the observer to get an incorrect stereoscopic matching pair is 1/8. The LED light bars can be constructed according to the method as shown in FIG. 7. That is, the distance between two adjacent light bars is a half of the width of an image, and they can perform a complete complementary embedded scan collaboratively. Because each LED light bar scans a half-width of an image at an original velocity, the refresh rate of the total frame has to be doubled. Thus, a stereoscopic image with a resolution of 640*480 pixels is displayed on tunnel walls at a refresh rate of 30 frames per second.

According to the description of FIG. 1 and FIG. 7, the present invention can mount LED light bars on subway tunnel walls so as to get an auto stereoscopic display system for subway tunnels. The system consists of LED light bars are equidistantly arranged vertically on tunnel walls. Passengers can image stereoscopic images without glasses when the LEDs are arranged according to multi-angle image pixel arrays and the train's real-time speeds changes In the auto stereoscopic display system, each LED light bar consists of multi-column LEDs and slit gratings. Wherein, RGB (Red, Green, and Blue) colors of the LEDs are arranged horizontally, are arranged top-bottom vertically, and are equidistant alignment or stagger in the vertical direction. Each column of the LEDs display pixels from different images. A slit grating is arranged in front of the LED light bars so as to allow that each eye only observes one column of LEDs and two eyes observe adjacent columns of LEDs when the heads of passengers move. Each of the numeral in front of the eye(s) of the observer represent one region that is illuminated by the LEDs through the slits. Here, we assume that the observer always moves in parallel with the tunnel walls, and all observation distances are kept constant. The arrangement of the slit gratings can allow that the width of one region illuminated by the LEDs is exactly equal to the distance between the two eyes of the observer. Because the slit gratings exist, the illuminated visible regions are always taken in reverse order in comparison with the LED source images.

Wherein, in each of the light bars, the multi-column LEDs are used, accompanying the slit gratings arranged in front of the multi-column LEDs. The slit gratings may be single-slit or multi-slit slit gratings.

In order to reduce the probability for the observer to observe an incorrect stereoscopic matching pair, it is unnecessary to modify the structure and arrangement mode of the LEDs. Assuming that initially there are K images, then once one image is added, the probability to get an incorrect stereoscopic matching pair can be reduced from a theoretical value 1/K to 1/(K+1). That is, once n images are added, the probability to get an incorrect stereoscopic matching pair can be reduced from a theoretical value 1/K to 1/(K+n).

In addition, in order to reduce the stitching phenomenon in non-homologous images, the amount of images is doubled, and the distance between adjacent gratings is doubled too, so that the two eyes observe across two images. Surely, the two eyes can be allowed to observe across n+1 images if the amount of images and the distance between adjacent gratings are increased n times.

In order to eliminate the black stripes, the multi-column LEDs can be modified from one mode that two adjacent rows are arranged in alignment in the vertical direction to the other mode that two adjacent rows are arranged in equidistant stagger. That is, one regular arrangement of the LEDs is decomposed into two complementary embedded arrangements.

Thus it can be seen that the present invention has the following advantages:

(1) In the present invention, because the LED light bars are equidistantly arranged vertically on tunnel walls and the LEDs are also arranged according to multi-angle image pixel arrays, passengers can observe stereoscopic images without wearing any special glasses when the train's real-time speeds changes. In comparison with the prior art which can only show 2D images, the present invention can display more vivid and authentic images.

(2) In the present invention, the probability for the passenger to observe an incorrect stereoscopic matching pair can be reduced by increasing the amount of images. Therefore, the display accuracy of the present invention is ensured in practices.

(3) In the present invention, the stitching phenomenon in non-homologous images can be reduced by increasing the amount of images and the distance between adjacent gratings. Thus, the accuracy of the display is ensured.

(4) In the present invention, the black stripes can be eliminated by decomposing one regular arrangement of the LEDs into two complementary embedded arrangements. Thus, the effect of stereoscopic image display is enhanced greatly.

The above-mentioned are only preferred embodiments of the present invention, and are not intended to limit the invention. Any modification, equivalent replacement, improvement, etc. of present invention within the spirit and principle, should be deemed to be comprised within the scope of the present invention.

What is claimed is:

1. An auto stereoscopic display system for subway tunnels, characterized in that: the auto stereoscopic display system for subway tunnels consists of several LED light bars which are equidistantly arranged vertically on tunnel walls, each LED light bar consists of multi-column LEDs and slit gratings; the multi-column LEDs are comprised of RGB LEDs; multiple passengers on a train can perceive stereoscopic images without glasses when the RGB LEDs are arranged according to multi-angle image pixel arrays and the train's real-time speed changes;

the RGB LEDs are operated to display different view images to each passenger's left and right eye with pixel values assigned to the RGB LEDs; when there are K source images to be displayed, which are represented as $PIC_k$, wherein k=1 . . . , K, and the resolution of each source image is M*N, M rows and N columns of LEDs arranged on the LED light bar; the index is $LED_{i,l}$, wherein i=1 . . . , M, l=1 . . . , L; when the train travels at a speed v, the color of the LEDs illuminated at time t is $$LED_{i,l}(t) = PIC_k(i,j)$$

wherein, k=(int(v*t/D−1)mod K)+1, j=(int(v*t/μ)mod N)+1, μ is the diameter of the LEDs, D is an average distance between each passenger's two eyes, int( ) is a rounding arithmetic operation, mod is a modulo arithmetic operation;

wherein, a frame scan rate r is calculated by the following equation:

$$r = v/(N*μ).$$

2. The auto stereoscopic display system for subway tunnels of claim 1, characterized in that: wherein, the RGB LEDs are equidistant alignment or stagger in the vertical direction, wherein, said stagger in the vertical direction of the RGB LEDs means the RGB LEDs are decomposed into two complementary embedded arrangements.

3. The auto stereoscopic display system for subway tunnels of claim 2, characterized in that: in each of the LED light bars, the multi-column LEDs are used, accompanying the slit gratings arranged in front of the multi-column LEDs, wherein the slit gratings are single-slit or multi-slit slit gratings.

4. The auto stereoscopic display system for subway tunnels of claim 2, characterized in that: the RGB LEDs are sized to eliminate un-illuminated regions between the RGB LEDs.

* * * * *